United States Patent
Chebruch et al.

(10) Patent No.: US 9,336,074 B2
(45) Date of Patent: May 10, 2016

(54) APPARATUS AND METHOD FOR DETECTING A FAULT WITH A CLOCK SOURCE

(71) Applicant: Honeywell International, Inc., Morristown, NJ (US)

(72) Inventors: Igor Chebruch, Warminster, PA (US); Daniel R. Shakarjian, Horsham, PA (US); Charles Martin, Blue Bell, PA (US)

(73) Assignee: Honeywell International Inc., Morris Plains, NJ (US)

( * ) Notice: Subject to any disclaimer, the term of this patent is extended or adjusted under 35 U.S.C. 154(b) by 182 days.

(21) Appl. No.: 13/952,356

(22) Filed: Jul. 26, 2013

(65) Prior Publication Data
US 2015/0033101 A1 Jan. 29, 2015

(51) Int. Cl.
*G06F 11/00* (2006.01)
*G06F 11/07* (2006.01)
*G06F 1/04* (2006.01)

(52) U.S. Cl.
CPC .............. *G06F 11/0751* (2013.01); *G06F 1/04* (2013.01)

(58) Field of Classification Search
CPC ............ G06F 11/0751; G06F 11/2294; G06F 11/079; G06F 11/22; G06F 11/2236; G06F 1/04; H04L 7/048; H04L 1/0057; H04L 1/0061
USPC .................................................. 714/25, 798
See application file for complete search history.

(56) References Cited

U.S. PATENT DOCUMENTS

| 4,000,650 A | 1/1977 | Snyder |
| 4,130,018 A | 12/1978 | Adams et al. |
| 5,136,299 A | 8/1992 | Edvardsson |
| 5,406,842 A | 4/1995 | Locke |

(Continued)

FOREIGN PATENT DOCUMENTS

| DE | 100 40 180 A1 | 4/2002 |
| JP | 58-47219 A | 3/1983 |

(Continued)

OTHER PUBLICATIONS

International Standard, Petroleum and liquid petroleum products—Measurement of level and temperature in storage tanks by automatic methods, Part 3: Measurement of level in pressurized storage tanks (non-refrigerated), 1st Edition, Nov. 15, 2002, 21 pages.

(Continued)

*Primary Examiner* — Yair Leibovich

(57) ABSTRACT

A method includes receiving a first clock signal from a first clock source at a clock monitoring unit. The method also includes counting a first number of pulses in the first clock signal during a specified time period. The method further includes identifying a fault with the first clock source when the first number does not have an acceptable value. In addition, the method includes testing the clock monitoring unit by determining whether the clock monitoring unit identifies an artificial clock fault. The time period could be defined by receiving a second clock signal, counting a second number of pulses in the second clock signal, and signaling when the second number meets or exceeds a threshold value. In response to the identified fault with the first clock source, a second clock source could be used to provide a second clock signal.

20 Claims, 5 Drawing Sheets

(56) References Cited

U.S. PATENT DOCUMENTS

| | | | |
|---|---|---|---|
| 5,442,359 A | 8/1995 | Rubin | |
| 5,773,913 A | 6/1998 | Casselden | |
| 5,774,089 A | 6/1998 | Bamler et al. | |
| 6,195,758 B1 * | 2/2001 | Lundh et al. | 713/500 |
| 6,314,055 B1 | 11/2001 | Foxlin et al. | |
| 6,629,458 B1 | 10/2003 | Westerling et al. | |
| 7,681,464 B2 | 3/2010 | Doh et al. | |
| 2002/0100317 A1 | 8/2002 | Deserno et al. | |
| 2003/0167839 A1 | 9/2003 | Burger et al. | |
| 2004/0148539 A1 * | 7/2004 | Leydier et al. | 713/500 |
| 2004/0196177 A1 | 10/2004 | Billington et al. | |
| 2005/0190098 A1 | 9/2005 | Bridgelall et al. | |
| 2007/0209434 A1 | 9/2007 | Peters | |

FOREIGN PATENT DOCUMENTS

| | | |
|---|---|---|
| JP | 60-73311 A | 4/1985 |
| JP | 2-236421 A | 9/1990 |
| NL | 1032192 | 7/2006 |
| WO | WO 2004/053521 A1 | 6/2004 |
| WO | WO 2007/053007 A1 | 5/2007 |
| WO | WO 2007/111498 A2 | 10/2007 |
| WO | WO 2008/010702 A1 | 1/2008 |
| WO | WO 2008/064421 A1 | 6/2008 |

OTHER PUBLICATIONS

"Servo Gauge 854ATG" Product Sheet, Enraf B.V., 4 pages.
"Level sensor", wikipedia.org, Aug. 2, 2008, 8 pages.
"HERMetic Sensor", Honeywell Enraf, 5 pages.
Bin Sai, "Method and Apparatus for Real-Time Calibration of a Liquid Storage Tank Level Gauge", U.S. Appl. No. 12/119,957, filed May 13, 2008.
Hisashi Motoyasu; "Translation of Stock Measuring Apparatus for Silo Storing Particulate Object" Fujita Corporation; JP 58047219; Mar. 18, 1983; 11 pages.
International Search Report dated Mar. 11, 2010 in connection with International Patent Application No. PCT/US2009/052905, 3 pages.
Written Opinion of International Searching Authority dated Mar. 11, 2010 in connection with International Patent Application No. PCT/US2009/052905, 4 pages.

* cited by examiner

APPARATUS AND METHOD FOR DETECTING A FAULT WITH A CLOCK SOURCE

TECHNICAL FIELD

This disclosure relates generally to clock generation systems. More specifically, this disclosure relates to an apparatus and method for detecting a fault with a clock source.

BACKGROUND

Numerous devices and systems use oscillators or other sources to generate clock signals. For example, various devices and systems can measure certain quantities of materials with a high degree of accuracy. As particular examples, petrochemicals and other materials may be measured during "custody transfers" when the materials are being transferred from one party to another, such as from a seller to a buyer. Among other things, the accuracy of the measured quantities can directly affect various financial obligations, such as taxes and tariffs, purchase or sale prices, and transit fees.

In conventional digital metering systems, a measured quantity of material is often proportional to the number of digital pulses in a clock signal counted during a specified time period. Thus, it is useful to have a stable clock source for a digital counter. High-stability clock oscillators are often used to generate accurate clock signals for digital counters. However, if a clock oscillator fails and the failure goes unnoticed for a period of time, this can significantly impact the financial obligations of one or more parties.

SUMMARY

This disclosure provides an apparatus and method for detecting a fault with a clock source.

In a first embodiment, a method includes receiving a first clock signal from a first clock source at a clock monitoring unit. The method also includes counting a first number of pulses in the first clock signal during a specified time period. The method further includes identifying a fault with the first clock source when the first number does not have an acceptable value. In addition, the method includes testing the clock monitoring unit by determining whether the clock monitoring unit identifies an artificial clock fault.

In a second embodiment, an apparatus includes a clock monitoring unit and a fault injection unit. The clock monitoring unit includes a first counter configured to receive a first clock signal from a first clock source and to count a first number of pulses in the first clock signal during a specified time period. The clock monitoring unit also includes a controller configured to identify a fault with the first clock source when the first number does not have an acceptable value. The fault injection unit is configured to create an artificial clock fault in order to test whether the clock monitoring unit identifies the artificial clock fault.

In a third embodiment, a system includes a first clock source, a clock monitoring unit, and a fault injection unit. The first clock source is configured to generate a first clock signal. The clock monitoring unit includes a first counter configured to receive the first clock signal from the first clock source and to count a first number of pulses in the first clock signal during a specified time period. The clock monitoring unit also includes a controller configured to identify a fault with the first clock source when the first number does not have an acceptable value. The fault injection unit is configured to create an artificial clock fault in order to test whether the clock monitoring unit identifies the artificial clock fault.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
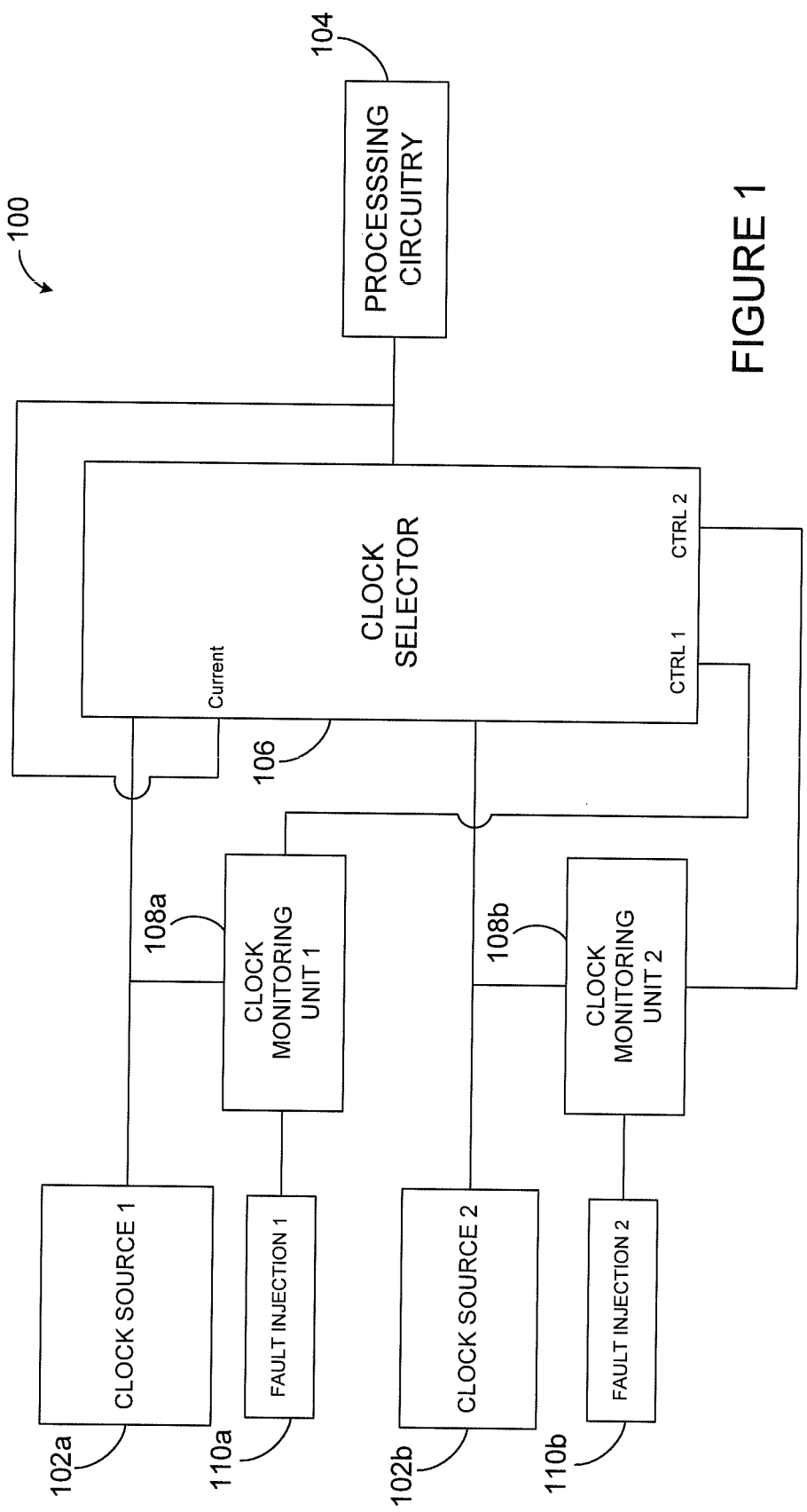
FIGS. 1 and 2 illustrate example systems using one or more clock signals according to this disclosure.
Figure 2:
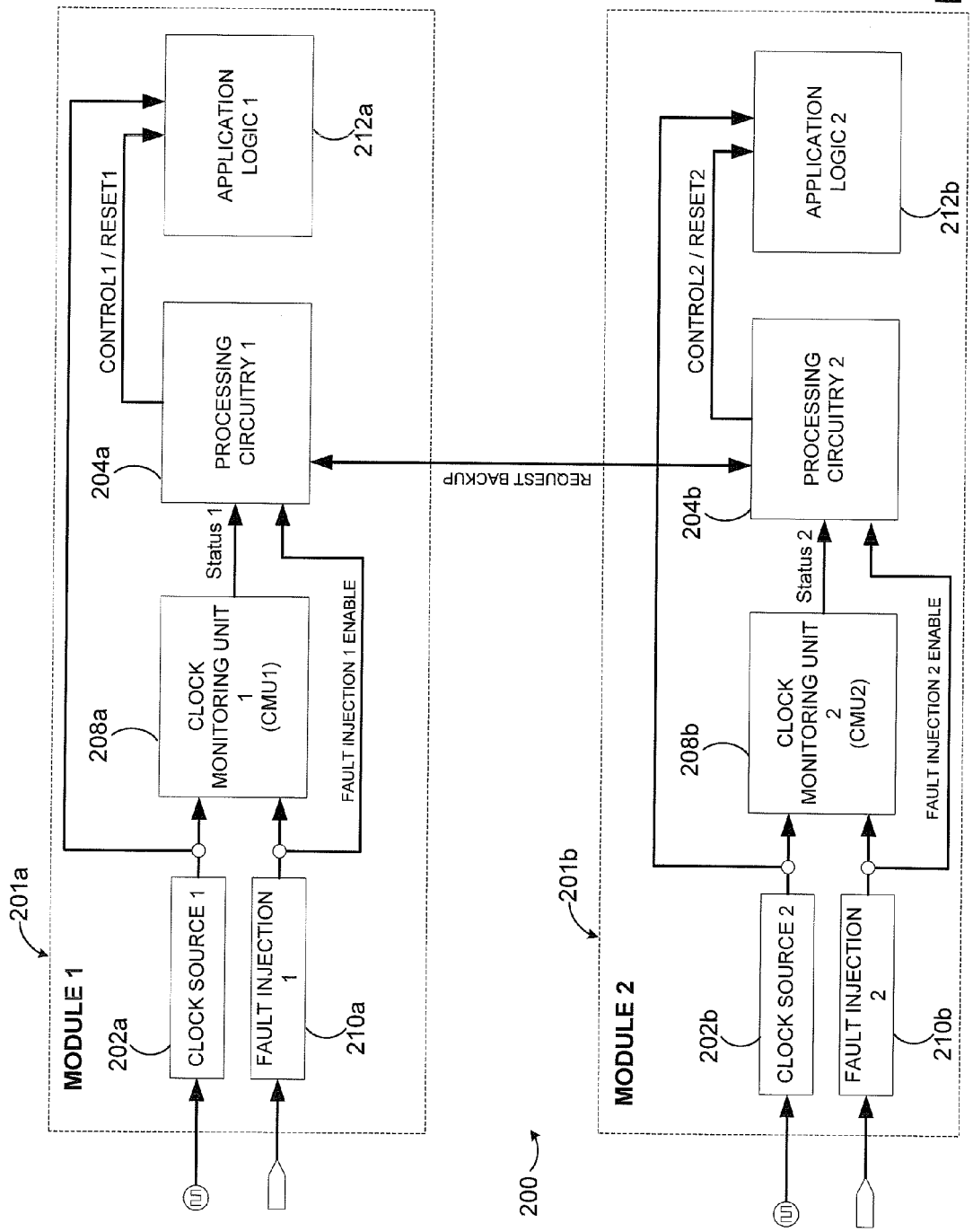

FIGS. 1 and 2 illustrate example systems using one or more clock signals according to this disclosure. As shown in FIG. 1, a system 100 includes one or more clock sources 102a-102b. Each clock source 102a-102b generates a clock signal that can be used by one or more other components of the system 100. Each clock source 102a-102b includes any suitable structure for generating a clock signal, such as a high-stability oscillator or other oscillator.

The system 100 could include any number of clock sources 102a-102b. In some embodiments, the system 100 could include a single clock source 102a. In other embodiments, the system 100 could include multiple clock sources 102a-102b. As a particular example, one clock source 102a could function as a primary clock source and provide a clock signal to other component(s) of the system 100. Another clock source 102b could function as a secondary clock source and provide a clock signal to other component(s) of the system 100 upon failure of the primary clock source. Any other suitable arrangements and uses of one or more clock sources could be used.

In the example shown in FIG. 1, a clock signal is provided to processing circuitry 104. The processing circuitry 104 could use the clock signal to perform any suitable operations. The processing circuitry 104 includes any suitable logic device(s), such as one or more microprocessors, microcontrollers, digital signal processors, field programmable gate arrays, application specific integrated circuits, or discrete circuits. Note, however, that the clock signal(s) from the clock source(s) 102a-102b could be used by any other suitable component(s) in the system 100.

When multiple clock sources 102a-102b are present, a clock selector 106 can be used to provide the clock signal from one of the clock sources 102a-102b to the processing circuitry 104. The clock selector 106 includes any suitable device for delivering at least one of multiple signals to a destination. The clock selector 106 could, for instance, represent a multiplexer or switch.

One or more clock monitoring units (CMUs) 108a-108b are used in the system 100 to detect the failure of one or more clock sources 102a-102b, respectively, and to take corrective action. For example, as described in more detail below, each clock monitoring unit 108a-108b can receive a clock signal generated by a clock source 102a-102b, count a number of pulses in the clock signal during a specified time period, and compare the counted number of pulses to one or more thresholds (such as thresholds defining a range of acceptable count values). If the counted number of pulses fails to satisfy the threshold(s), the clock monitoring unit 108a-108b can determine that an error in the clock signal has been detected, and the clock monitoring unit 108a-108b can take suitable corrective action(s).

The corrective action(s) taken by a clock monitoring unit 108a-108b can vary depending on the implementation. For example, a clock monitoring unit 108a-108b could trigger an alarm to notify appropriate personnel of a clock source fault. When a single clock source 102a is present or when all clock sources 102a-102b have failed, the clock monitoring unit(s) 108a-108b could disable the processing circuitry 104 from further processing or operation, such as by generating an interrupt for the processing circuitry 104. When multiple clock sources 102a-102b are present and only the primary clock source fails, the clock monitoring unit(s) 108a-108b could cause the clock signal from the secondary clock source to be provided to the processing circuitry 104 (via the clock selector 106).

As described in more detail below, each clock monitoring unit 108a-108b may also support a feature that allows that clock monitoring unit 108a-108b itself to be tested (such as by an external device or system). For example, each clock monitoring unit 108a-108b could be tested during runtime to verify that the clock monitoring unit 108a-108b accurately detects a clock source fault. In some embodiments, external circuits (such as fault injection units 110a-110b) can force clock faults, such as by inserting fault into clock signals or modifying reference signals used to count pulses in the clock signals. The output of a clock monitoring unit 108a-108b can then be examined to determine whether the clock monitoring unit 108a-108b accurately detected a clock fault. If the clock fault is not detected by the clock monitoring unit 108a-108b, an error can be generated indicating that the clock monitoring unit 108a-108b is malfunctioning. If the clock monitoring unit 108a-108b does detect the clock fault, the system 100 can determine that the clock monitoring unit 108a-108b is operating properly and ignore the fault detected by the clock monitoring unit 108a-108b (since the fault was artificially created to test the unit 108a-108b). This testing of the clock monitoring unit 108a-108b could occur periodically, upon demand, or at any other suitable time(s).

In this way, each clock monitoring unit 108a-108b is able to rapidly detect a clock source fault and take suitable corrective action, which can help to reduce or prevent the effects of the clock source fault from propagating to other parts of the system. When a secondary clock source replaces a failed primary clock source, the other system components (such as the processing circuitry 104) can continue operating normally and may or may not be made aware that a fault has occurred. As a particular example, when used in a digital metering system for measuring fluids or gases, the digital metering system can continue to accurately measure the fluids or gases even after the primary clock source fails. Moreover, fault injection testing of each clock monitoring unit 108a-108b can be used to help verify proper operation of the clock monitoring units 108a-108b during routine operation and over time.

Each clock monitoring unit 108a-108b includes any suitable structure(s) for identifying a fault in at least one clock signal. In some embodiments, the various components of each clock monitoring unit 108a-108b can be implemented in hardware, such as with a programmable logic device and other hardware components. However, any hardware or combination of hardware and software/firmware could be used to implement each clock monitoring unit 108a-108b. Each fault injection unit 110a-110b includes any suitable structure for causing an artificial fault to appear in a clock path. The phrase "clock path" refers to the path traversed by a clock signal, and a fault can be introduced at any point along the clock path or in any component located along the clock path. The phrase "artificial fault" refers to a clock fault that is created for the purpose of testing a clock monitoring unit.

Note that in FIG. 1, each clock monitoring unit 108a-108b is coupled to one associated clock source 102a-102b. As a result, each clock monitoring unit 108a-108b could be used to test one clock source 102a-102b. However, other embodiments could also be used, such as when a single clock monitoring unit is used to test different clock sources in an interleaved manner. In general, any number of clock monitoring units can be used with any number of clock sources.

The system 100 shown in FIG. 1 could find use in a large number of possible applications. For example, the system 100 could be used in metering applications where measurements of material (such as density, flow rate, or volume measurements) are made with a high degree of accuracy. The system 100 could also be used in custody transfer applications where material such as liquid or gas is transferred from one storage location to another (like an oil transfer from an oil tanker into a delivery truck). Other example uses include flight systems, communication systems, medical applications, and other applications involving mission-critical processor devices or other devices that use clock signals.

Note that any suitable clock fault could be detected by each clock monitoring unit 108a-108b. For example, each clock monitoring unit 108a-108b could detect a "stuck at" fault in which a clock signal is stuck at a logical high or logical low value. Each clock monitoring unit 108a-108b could also detect a frequency offset error in a clock signal. Any other or additional faults could be detected by each clock monitoring unit 108a-108b.

While the system 100 in FIG. 1 uses redundant clock sources, a system 200 as shown in FIG. 2 uses redundant modules 201a-201b. Each module 201a-201b here respectively includes a clock source 202a-202b, processing circuitry 204a-204b, a clock monitoring unit 208a-208b, and a fault injection unit 210a-210b. These components can be the same as or similar to the corresponding components in FIG. 1, except that the processing circuitry 204a-204b in each module 201a-201b does not use the clock signal from its associated clock source 202a-202b. Rather, application logic 212a-212b in each module 201a-201b uses the clock signal from its associated clock source 202a-202b. Each application logic 212a-212b represents any suitable structure for performing one or more desired functions using at least one clock signal.

The processing circuitry 204a-204b in each module 201a-201b is responsible for controlling the associated application logic 212a-212b. For example, each processing circuitry 204a-204b could receive an indication from the associated clock monitoring unit 208a-208b indicating whether the associated clock source 202a-202b is operating properly. Each processing circuitry 204a-204b could also receive a fault injection enable signal, which indicates whether the associated clock monitoring unit 208a-208b is being tested (and therefore any fault indication can be ignored). Each processing circuitry 204a-204b could further provide an enable or reset signal to the associated application logic 212a-212b, which allows the processing circuitry 204a-204b to disable the application logic 212a-212b when a clock fault is detected.

The modules 201a-201b here can be used in a redundant manner. For example, the application logic 212a-212b in both modules 201a-201b could be configured to execute the same logic or otherwise perform the same functions. One module could function as a primary module, and the other module could function as a secondary module. Upon a failure in the primary module (such as upon the detection of a clock fault), the processing circuitry in the primary module could notify the processing circuitry in the secondary module. The secondary module could then assume the primary mode of operation.

Although FIGS. 1 and 2 illustrate examples of systems using one or more clock signals, various changes may be made to FIGS. 1 and 2. For example, FIGS. 1 and 2 illustrate two example operational environments in which a clock monitoring unit could be used. A clock monitoring unit could be used in any other suitable device or system having at least one clock signal to be tested. Also, the functional divisions shown in FIGS. 1 and 2 are for illustration only. Various components in FIGS. 1 and 2 could be combined, further subdivided, or omitted and additional components could be added according to particular needs. For instance, a fault injection unit could be incorporated into a clock monitoring unit or processing circuitry.

Figure 3:
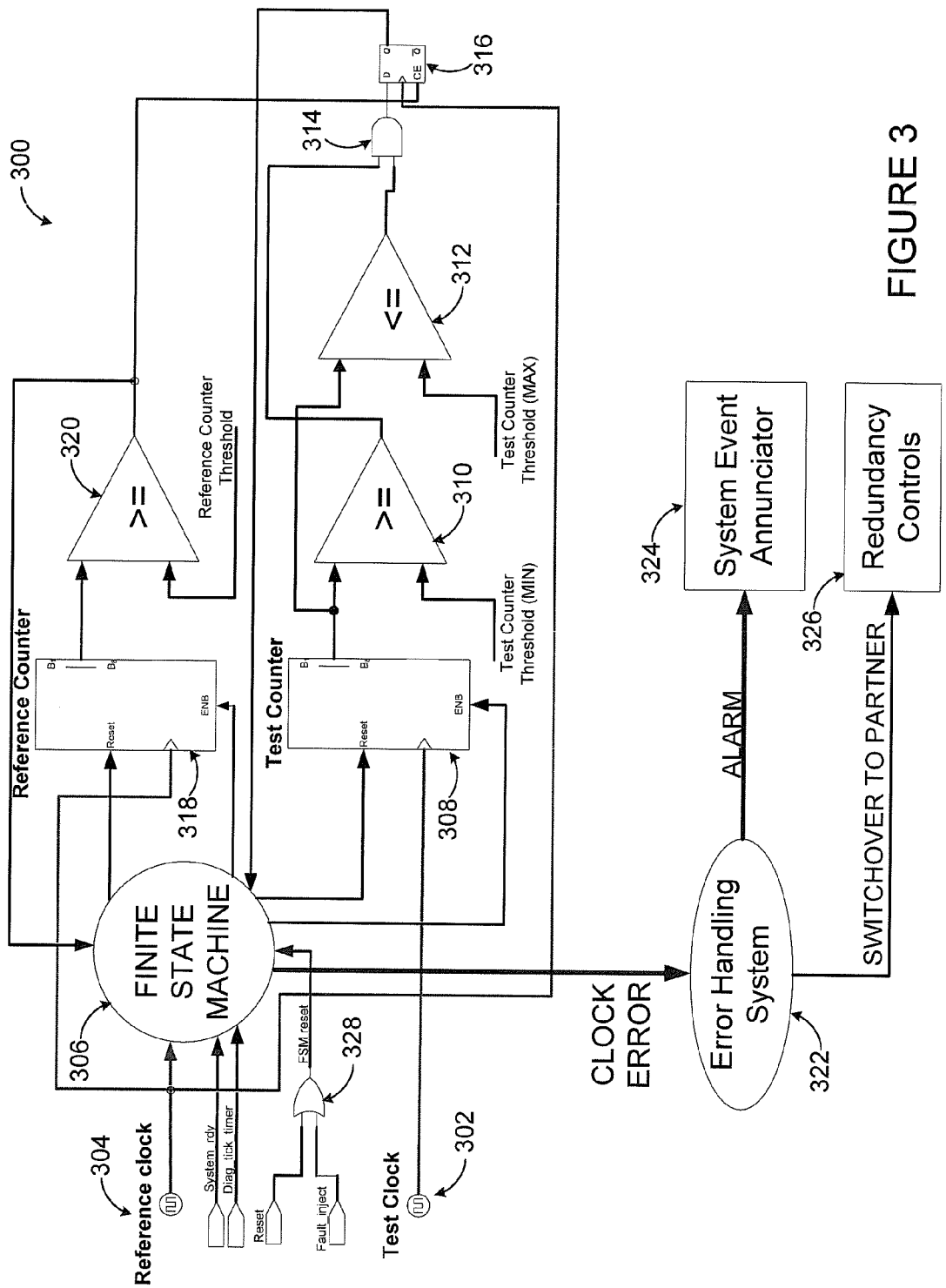
FIG. 3 illustrates an example clock monitoring unit for detecting a clock source fault according to this disclosure.

FIG. 3 illustrates an example clock monitoring unit 300 for detecting a clock source fault according to this disclosure. The unit 300 could, for example, represent the clock monitoring units 108a-108b in the system 100 of FIG. 1 or the clock monitoring units 208a-208b in the system 200 of FIG. 2. Note, however, that the unit 300 could be used in any other suitable device or system.

As shown in FIG. 3, the unit 300 receives a test clock signal 302 and a reference clock signal 304. The test clock signal 302 represents the clock signal from a clock source to be tested. For instance, the test clock signal 302 could represent the clock signal from a clock source 102a-102b, 202a-202b. The reference clock signal 304 represents a clock signal from a known good clock source that is used by the unit 300 to (among other things) define the time period during which pulses are counted in the test clock signal 302. For example, the reference clock signal 304 could be generated by or fed to the processing circuitry 104, 204a-204b.

The unit 300 also includes a finite state machine (FSM) or other controller 306, which controls the overall operation of the unit 300. As described below, the controller 306 can control when the test clock signal 302 is tested and output a signal indicating whether a fault is detected. The controller 306 includes any suitable structure for controlling testing of a clock signal, such as one or more microprocessors, microcontrollers, digital signal processors, field programmable gate arrays, application specific integrated circuits, or discrete circuits.

The test clock signal 302 is provided to a test counter 308, which counts the number of pulses contained in the test clock signal 302 under the control of the controller 306. For example, the controller 306 can reset the value that is output by the test counter 308 and enable counting by the test counter 308. The test counter 308 outputs a test count value that represents the number of pulses in the test clock signal 302 counted while the test counter 308 is enabled and not reset. The test counter 308 includes any suitable structure for counting pulses in a clock signal, such as an 8-bit or other multi-bit counter.

The test count value generated by the test counter 308 is provided to two comparators 310-312. Each comparator 310-312 compares the test count value from the test counter 308 to a threshold value. In this example, the comparator 310 compares the test count value to a minimum acceptable count value, and the comparator 312 compares the test count value to a maximum acceptable count value. The minimum and maximum acceptable values define a range of values in which the test count value from the test counter 308 should ideally fall. Each comparator 310-312 includes any suitable structure for comparing multiple values.

An AND gate 314 performs a logical AND operation using the outputs of the comparators 310-312. If the test count value from the test counter 308 is greater than or equal to the minimum threshold hold value and less than or equal to the maximum threshold hold, the AND gate 314 could output one logical value (such as a "1"). If either condition is not met, the AND gate 314 could output another logical value (such as a "0"). The AND gate 314 therefore outputs a value indicating whether the test count value from the test counter 308 falls within the range defined by the minimum and maximum acceptable values (thereby identifying whether a fault has been detected). The AND gate 314 includes any suitable structure for performing a logical AND operation.

The output of the AND gate 314 is sampled using a latch 316. The output of the latch 316 therefore provides an indication whether a fault has been detected with the test clock signal 302. If the number of pulses counted in the test clock signal 302 exceeds the maximum threshold value or falls below the minimum threshold value, this is indicative of some type of fault with the clock source providing the test clock signal 302. The latch 316 captures the output of the AND gate 314 and provides this value back to the controller 306, which can take suitable corrective action if a clock source fault is indicated. The latch 316 includes any suitable structure for capturing a value, such as a D flip-flop.

The reference clock signal 304 in FIG. 3 is used to clock the controller 306 and the latch 316. The reference clock signal 304 is also used to define the length of time during which pulses in the test clock signal 302 are counted. This is done by providing the reference clock signal 304 to a reference counter 318, which counts the number of pulses in the reference clock signal 304 and outputs a reference count value. The controller 306 can reset the value that is output by the reference counter 318 and enable counting by the reference counter 318. The reference count value is provided to a comparator 320, which compares the reference count value to a threshold.

When the reference count value does not exceed the threshold, the comparator 320 provides a first value to the "clock enable" input of the latch 316 and to the controller 306. When the reference count value equals or exceeds the threshold, the comparator 320 provides a second value to the "clock enable" input of the latch 316 and to the controller 306. This causes the latch 316 to capture the output of the AND gate 314 and informs the controller 306 that the pulses in the test clock signal 302 have been counted for a specified period of time. By controlling the frequency of the reference clock signal 304 and/or the threshold value used by the comparator 320, the time period during which the pulses in the test clock signal 302 are counted can be controlled. The reference counter 318 includes any suitable structure for counting pulses in a clock signal, such as an 8-bit or other multi-bit counter. The comparator 320 includes any suitable structure for comparing multiple values. The threshold used by the comparator 320 could be set in any suitable manner, such as by a system or user for a particular application.

In some embodiments, the controller 306 can enable both counters 308 and 318 simultaneously. The counter 308 counts pulses in the test clock signal 302, and the counter 318 counts pulses in the reference clock signal 304. When the counter 318 counts a threshold number of pulses in the reference clock signal 304, a specified amount of time for counting pulses in the test clock signal 302 has elapsed. Once the specified amount of time has elapsed, the latch 316 latches a value indicative of whether the counted number of pulses in the test clock signal 302 is within a desired range. Based on the output of the latch 316, the controller 306 makes a determination whether a fault has been detected in the test clock signal 302. If a fault is detected, the controller 306 can assert a "clock error" signal. The controller 306 could assert the "clock error" signal in response to one or multiple failures to count a correct number of pulses in the test clock signal 302 during one or multiple time periods.

The "clock error" signal could be used in any suitable manner. For example, as noted above, the "clock error" signal could be used as an interrupt for the processing circuitry 104, 204a-204b or other devices. As shown in FIG. 3, the "clock error" signal is provided to an error handling system 322, which uses the "clock error" signal to trigger various actions. For instance, the error handling system 322 can generate an alarm, which can be provided to a system event annunciator 324 that creates a visible, audible, or other type of alarm notification. The error handling system 322 can also generate a signal for redundancy controls 326, which causes the redundancy controls 326 to take corrective action. The corrective action could include the clock selector 106 changing the clock signal that is provided to the processing circuitry 104, application logic 212a-212b, or other components. The corrective action could also include switching from one module 201a to another module 201b. The error handling system 322 could further generate a fail code unique to or otherwise associated with the fault, and the fail code and any associated data could be stored for later use. The "clock error" signal could be used in any other suitable manner.

As shown in FIG. 3, the controller 306 can receive various other signals for controlling the operation of the unit 300. For example, a "System_rdy" signal can be used to indicate that a peripheral system (such as the system 100 or 200) is ready for operation. A "Diag_tick_timer" signal can be used to indicate that the peripheral system is ready to process outputs from the controller 306. When the peripheral system is ready for operation and is ready to process outputs from the controller 306, the controller 306 can begin operation to verify the proper number of pulses in the test clock signal 302. A "Reset" signal can be used to reset the controller 306. A "Fault_inject" signal can be used to indicate to the controller 306 that a test of the unit 300 is under way. As noted above, the test can involve artificially injecting a fault into the test clock signal 302 and verifying that the unit 300 properly detects the fault. A logical OR gate 328 is used here to indicate that the controller 306 can be reset in response to the "Reset" signal or the "Fault_inject" signal (if the OR gate 328 has additional inputs, other sources could also be used to reset the controller 306).

Although FIG. 3 illustrates one example of a clock monitoring unit 300 for detecting a clock source fault, various changes may be made to FIG. 3. For example, while shown and described as being implemented using various hardware components, one, some, or all of the components in FIG. 3 could be implemented using hardware and software/firmware instructions. Also, the uses of the "clock error" signal shown in FIG. 3 are for illustration only. Further, the use of multiple comparators 310-312 may not be required, such as when the threshold to a single comparator is varied in order to perform serial comparisons of the test count value to different thresholds.

Figure 4:
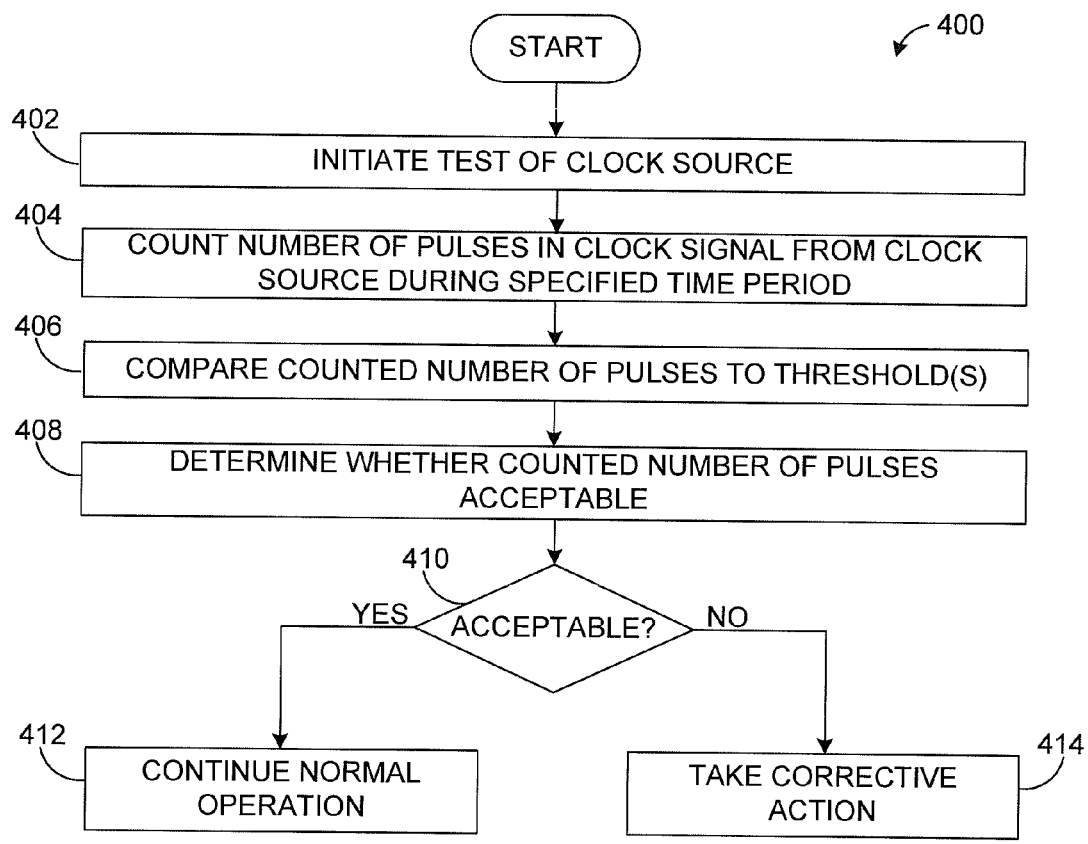
FIG. 4 illustrates an example method of detecting a clock source fault according to this disclosure.

FIG. 4 illustrates an example method 400 for detecting a clock source fault according to this disclosure. As shown in FIG. 4, a test of a clock source is initiated at step 402. This could include, for example, the controller 306 enabling the counters 308 and 318. This could also include providing suitable threshold values to the comparators 310, 312, 320.

The pulses in a clock signal from the clock source are counted during a specified time period at step 404. This could include, for example, the test counter 308 counting the number of pulses in the test clock signal 302. The specified time period can be defined by counting the pulses in the reference clock signal 304 until a specified number of pulses have been counted (as indicated by the comparator 320).

The counted number of pulses in the clock signal from the clock source is compared to one or more thresholds at step 406. This could include, for example, comparing the output of the test counter 308 to maximum and minimum threshold values using the comparators 310-312.

A determination is made whether the counted number of pulses is acceptable at step 408. This could include, for example, combining the outputs of the comparators 310-312 to generate a value indicative of whether the counted number of pulses falls within a range of expected or acceptable values.

If the counted number of pulses is acceptable at step 410, normal operation of the system may continue at step 412. In this case, there is no fault detected in the clock signal from the clock source, and no additional steps may need to be taken. Otherwise, if the counted number of pulses is not acceptable at step 410, corrective action is taken at step 414. This could include, for example, the controller 306 sending an interrupt or other signal to the processing circuitry 104, 204a-204b or sending an error signal to the error handling system 322. Example corrective actions include disabling further processing by a processing device or application logic, triggering an alarm, or changing to a redundant or backup clock source, module, or system.

The method 400 shown in FIG. 4 could be repeated any number of times and at any suitable times. For example, the method 400 could be repeated at a specified interval or randomly. The method 400 could also be performed continuously or near continuously, such as when the ending of one specified time period is followed immediately or almost immediately by another specified time period.

Although FIG. 4 illustrates one example of a method 400 for detecting a clock source fault, various changes may be made to FIG. 4. For example, while shown as a series of steps, various steps in FIG. 4 could overlap, occur in parallel, or occur multiple times.

Figure 5:
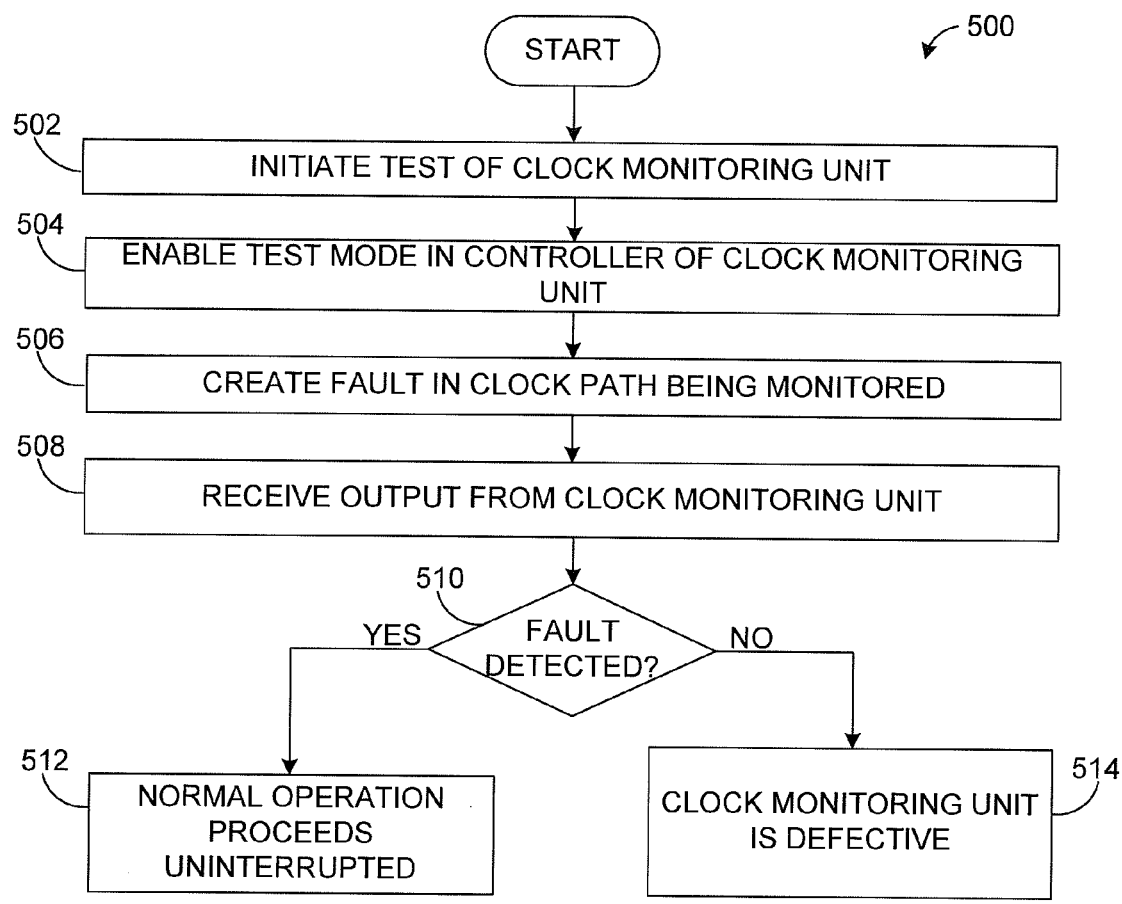
FIG. 5 illustrates an example method of testing a clock monitoring unit that detects a clock source fault according to this disclosure.

FIG. 5 illustrates an example method 500 of testing a clock monitoring unit that detects a clock source fault according to this disclosure. As shown in FIG. 5, a test of a clock monitoring unit is initiated at step 502. This could include, for example, starting a test of the clock monitoring unit 300 to ensure proper operation of the unit 300. The test could be initiated at a specified interval, on demand, or at any other suitable time. A controller in the clock monitoring unit is informed of the test at step 504. This could include, for example, enabling the "Fault_inject" signal provided to the controller 306.

A fault is created in the clock path associated with the clock signal being monitored at step 506. This could include, for example, a fault injection unit 110a-110b, 210a-210b modifying the test clock signal 302 to alter the number of pulses in the test clock signal 302. This could also include the fault injection unit 110a-110b, 210a-210b modifying the reference clock signal 304 used by the clock monitoring unit being tested. Any other suitable technique could be used to introduce an apparent fault into the clock path of the clock signal. Note that the actual signal from a clock source (either the clock source under test or a clock source not under test) can continue being provided to other components of the system, such as to processing circuitry or application logic, so that the test of the unit 300 does not interfere with the operation of those components.

An output of the clock monitoring unit is received at step 508. This could include, for example, receiving the "clock error" signal from the unit 300. If the output indicates that a fault was detected at step 510, the clock monitoring unit correctly identified the purposely-injected clock fault, and normal operation of the clock monitoring unit proceeds uninterrupted at step 512. If the output indicates that no fault was detected at step 510, the clock monitoring unit is identified as defective at step 514. In this case, any suitable actions could occur, such as triggering an alarm, shutting down a peripheral system, switching to a redundant module, or allowing operation of the system to continue while maintenance activities are performed.

The method 500 shown in FIG. 5 could be repeated any number of times and at any suitable times. For example, the method 500 could be repeated at a specified interval or randomly. Note that a user could set an interval between executions of the method 500 to balance interruption of clock source monitoring against the risk of an undetected monitoring unit failure.

Although FIG. 5 illustrates one example of a method 500 of testing a clock monitoring unit that detects a clock source fault, various changes may be made to FIG. 5. For example, while shown as a series of steps, various steps in FIG. 5 could overlap, occur in parallel, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving a first clock signal from a first clock source at a clock monitoring unit;
   providing the first clock signal to a first component that operates using the first clock signal;
   counting a first number of pulses in the first clock signal during a specified time period;
   identifying a fault with the first clock source when the first number does not have an acceptable value;
   in response to the identified fault with the first clock source, causing a second clock source to provide a second clock signal to at least one of: the first component and a redundant second component; and
   testing the clock monitoring unit by determining whether the clock monitoring unit identifies an artificial clock fault.

2. The method of claim 1, wherein testing the clock monitoring unit comprises creating the artificial clock fault and determining whether the clock monitoring unit outputs a signal indicating that the artificial clock fault has been detected.

3. The method of claim 1, further comprising identifying the specified time period by:
   receiving a third clock signal;
   counting a second number of pulses in the third clock signal; and
   signaling when the second number meets or exceeds a threshold value.

4. The method of claim 1, further comprising:
   comparing the first number to a minimum threshold value and a maximum threshold value; and
   determining that the first number does not have the acceptable value when the first number is below the minimum threshold value or above the maximum threshold value.

5. The method of claim 1, further comprising, in response to identifying the fault with the first clock source, at least one of:
   generating an alarm;
   disabling or interrupting operation of at least one of the first component and the second component; and
   generating a fail code and associating the fail code and data related to the identified fault with the first clock source.

6. A method comprising:
   receiving a first clock signal from a first clock source at a clock monitoring unit;
   counting a first number of pulses in the first clock signal during a specified time period;

generating an indicator identifying whether the first number has an acceptable value;
sampling the indicator when the specified time period elapses;
identifying a fault with the first clock source when the first number does not have the acceptable value; and
testing the clock monitoring unit by determining whether the clock monitoring unit identifies an artificial clock fault.

7. The method of claim 6, further comprising:
providing the first clock signal to a first component that operates using the first clock signal; and
in response to the identified fault with the first clock source, causing a second clock source to provide a second clock signal to at least one of: the first component and a redundant second component.

8. An apparatus comprising:
a clock monitoring unit comprising:
   a first counter configured to receive a first clock signal from a first clock source and to count a first number of pulses in the first clock signal during a specified time period;
   a first comparator configured to compare the first number to a minimum threshold value;
   a second comparator configured to compare the first number to a maximum threshold value;
   a second counter configured to receive a second clock signal and to count a second number of pulses in the second clock signal;
   a third comparator configured to signal when the second number meets or exceeds a third threshold value;
   logic configured to generate an indicator identifying whether the first number has an acceptable value based on outputs of the first and second comparators;
   a latch configured to sample the indicator based on an output of the third comparator; and
   a controller configured to identify a fault with the first clock source when the first number does not have the acceptable value; and
a fault injection unit configured to create an artificial clock fault in order to test whether the clock monitoring unit identifies the artificial clock fault.

9. The apparatus of claim 8, wherein the controller comprises a finite state machine.

10. The apparatus of claim 8, further comprising:
application logic configured to use the first clock signal; and
processing circuitry configured to receive an output from the clock monitoring unit and an indication whether the clock monitoring unit is being tested, the processing circuitry also configured to enable the application logic when no fault with the first clock source is identified and to disable the application logic when the fault with the first clock source is identified.

11. An apparatus comprising:
a clock monitoring unit comprising:
   a first counter configured to receive a first clock signal from a first clock source and to count a first number of pulses in the first clock signal during a specified time period; and
   a controller configured to identify a fault with the first clock source when the first number does not have an acceptable value;
a fault injection unit configured to create an artificial clock fault in order to test whether the clock monitoring unit identifies the artificial clock fault; and
a clock selector configured to receive the first clock signal and a second clock signal and to provide the first clock signal to a component that is configured to operate using the first clock signal;
wherein, in response to the identified fault with the first clock source, the clock selector is configured to provide the second clock signal to the component.

12. The apparatus of claim 11, further comprising:
a second counter configured to receive a third clock signal and to count a second number of pulses in the third clock signal;
a first comparator configured to signal when the second number meets or exceeds a first threshold value;
a second comparator configured to compare the first number to a minimum threshold value; and
a third comparator configured to compare the first number to a maximum threshold value.

13. The apparatus of claim 12, further comprising:
logic configured to generate an indicator identifying whether the first number has the acceptable value based on outputs of the second and third comparators; and
a latch configured to sample the indicator based on an output of the first comparator.

14. An apparatus comprising:
a clock monitoring unit comprising:
   a first counter configured to receive a first clock signal from a first clock source and to count a first number of pulses in the first clock signal during a specified time period; and
   a controller configured to identify a fault with the first clock source when the first number does not have an acceptable value;
a fault injection unit configured to create an artificial clock fault in order to test whether the clock monitoring unit identifies the artificial clock fault, the clock monitoring unit and the fault injection unit forming a first module; and
a second module configured to generate a second clock signal;
wherein the apparatus is configured to provide the first clock signal to a component; and
wherein, in response to the identified fault with the first clock source, the apparatus is configured to provide the second clock signal to the component.

15. The apparatus of claim 14, further comprising:
a second counter configured to receive a third clock signal and to count a second number of pulses in the third clock signal; and
a comparator configured to signal when the second number meets or exceeds a threshold value.

16. A system comprising:
a first clock source configured to generate a first clock signal;
a clock monitoring unit comprising:
   a first counter configured to receive the first clock signal from the first clock source and to count a first number of pulses in the first clock signal during a specified time period; and
   a controller configured to identify a fault with the first clock source when the first number does not have an acceptable value;
a fault injection unit configured to create an artificial clock fault in order to test whether the clock monitoring unit identifies the artificial clock fault;
application logic configured to use the first clock signal; and processing circuitry configured to receive an output from the clock monitoring unit and an indication whether the clock monitoring unit is being tested, the processing circuitry also configured to enable the application logic when no fault with the first clock source is identified and to disable the application logic when the fault with the first clock source is identified.

17. The system of claim 16, further comprising:
a second clock source configured to generate a second clock signal; and
a clock selector configured to receive the first clock signal and the second clock signal and to provide the first clock signal to the application logic;
wherein, in response to the identified fault with the first clock source, the clock selector is configured to provide the second clock signal to the application logic.

18. The system of claim 16, wherein:
the clock monitoring unit and the fault injection unit form a first module;
the system further comprises a second module configured to generate a second clock signal;
the system is configured to provide the first clock signal to the application logic; and
in response to the identified fault with the first clock source, the system is configured to provide the second clock signal to the application logic.

19. The system of claim 16, wherein the clock monitoring unit further comprises:
a second counter configured to receive a second clock signal and count a second number of pulses in the second clock signal; and
a first comparator configured to signal when the second number meets or exceeds a first threshold value.

20. The system of claim 19, wherein the clock monitoring unit further comprises:
a second comparator configured to compare the first number to a minimum threshold value;
a third comparator configured to compare the first number to a maximum threshold value;
logic configured to generate an indicator identifying whether the first number has the acceptable value based on outputs of the second and third comparators; and
a latch configured to sample the indicator based on an output of the first comparator.

* * * * *